(12) United States Patent
Spencer

(10) Patent No.: US 6,839,155 B2
(45) Date of Patent: Jan. 4, 2005

(54) LOCATING EDGES OF A SCANNED DOCUMENT

(75) Inventor: Christopher J. Spencer, Shortsville, NY (US)

(73) Assignee: Xerox Corporation, Stamford, CT (US)

( * ) Notice: Subject to any disclaimer, the term of this patent is extended or adjusted under 35 U.S.C. 154(b) by 739 days.

(21) Appl. No.: 09/761,492

(22) Filed: Jan. 16, 2001

(65) Prior Publication Data

US 2002/0093692 A1 Jul. 18, 2002

(51) Int. Cl.[7] .................................................. H04N 1/04
(52) U.S. Cl. ....................... 358/488; 358/496; 358/449; 358/464; 358/486
(58) Field of Search ................................ 358/488, 486, 358/461, 496, 474, 471, 400, 505, 473, 464, 449, 465, 498, 483; 382/312, 313, 274, 199, 286, 291, 318, 319; 250/234–236, 208.1, 559.24, 559.19; 399/376, 370, 379, 380

(56) References Cited

U.S. PATENT DOCUMENTS

| | | | | |
|---|---|---|---|---|
| 4,314,159 A | | 2/1982 | Davis | 250/559.36 |
| 4,538,905 A | | 9/1985 | Griego et al. | 347/139 |
| 4,623,938 A | | 11/1986 | Asano et al. | 358/406 |
| 5,805,308 A | * | 9/1998 | Tanaka et al. | 358/486 |
| 5,994,711 A | | 11/1999 | Seachman et al. | 250/559.36 |
| 6,005,683 A | * | 12/1999 | Son et al. | 358/488 |
| 6,134,027 A | * | 10/2000 | Lee | 358/474 |
| 6,271,935 B1 | * | 8/2001 | Cook | 358/1.9 |
| 6,621,599 B1 | * | 9/2003 | Newell | 358/474 |
| 6,636,335 B1 | * | 10/2003 | Tang et al. | 358/496 |
| 6,741,741 B2 | * | 5/2004 | Farrell | 382/199 |

FOREIGN PATENT DOCUMENTS

EP          0 679 010 A2      10/1995

OTHER PUBLICATIONS

Kraig A. Quinn, "Assembly Of Imaging Arrays For Large Format Documents", U.S. Appl. No. 09/677,742.

* cited by examiner

Primary Examiner—Cheukfan Lee

(57) ABSTRACT

A structure and method for improved detection of the edges of a document in a scanner provides for positioning a width detection backer so that it is simultaneously in the field of view of the optical element of the scanner and out of the focal plane of the optical element. A portion of a document is positioned in the optical path between the optical element and the width detection backer and scanned with the optical element. Information from the scanning step is analyzed to identify data indicative of an edge of the document. The out of focus width detection backer, which remains stationary while scanning the document portion presents very little variation in intensity and other data, heightening the contrast between the document and the width detection backer, and reducing the likelihood of erroneously identifying elements of the width detection backer as document edge features.

15 Claims, 8 Drawing Sheets

LOCATING EDGES OF A SCANNED DOCUMENT

FIELD OF THE INVENTION

The present invention relates to document scanning devices. In particular, the present invention relates to determining the size of a document being scanned by a scanning device. In further particularity, the invention relates to identifying the edges of the document, to assist in determining the location and size of the document bearing the image to be scanned.

BACKGROUND OF THE INVENTION

A document scanner receives light reflected from a document, and converts the image on the document into a format for further processing. An analog light lens scanner uses a lens to project the image onto an apparatus, such as a photoreceptor, to reproduce the document image through electrostatic printing. Scanners may also use digital photosensors that convert the light reflected from the document into digital electronic information. A lens may focus the document image onto the digital photosensors. Alternatively, a linear array of photosensors may extend across the entire width of the document to be scanned. The linear array of photosensors may be moved along the document, or the document may be moved past the linear array of photosensors. In certain instances, it may be possible to scan the documents using digital photosensors that move in a raster format, moving the photosensors across the document in a predetermined pattern.

For many document image processing functions, it is useful to identify the precise location of the edge of the document. For example, in a scanning function, identifying the edges of the document permits the scanner to determine the size of the document being scanned, and its position. Knowing the size and position of the document also permits the scanner to identify the document background, so that any image processing functions performed by the scanner can compensate for or otherwise appropriately handle particular document backgrounds, such as color backgrounds.

Various edge detection algorithms and techniques are currently in use and well understood in the art. Typically, such techniques identify edge-like features that indicate possible document edges, and use the difference in background intensity between the document and the scanner's document backer to distinguish the document from the backer. Such differences may be difficult to detect if the document background is similar to the scanner's document backer. In addition, a frequent challenge for an edge detection algorithm is to avoid identifying marks or other variations on the document backer as a document edge. Another challenge is to avoid identifying data from a poorly functioning scanner detector as a document edge.

SUMMARY OF THE INVENTION

The present invention is a method and apparatus for improved locating the edges of a print medium, such as a document in a scanned image.

In accordance with the method of the present invention, a width detection backer is positioned so that it is simultaneously in the field of view of the optical element of the scanner and out of the focal plane of the optical element. A portion of a document is positioned in the optical path between the optical element and the width detection backer. The portion of the document is scanned with the optical element, and information from the scanning step is analyzed to identify data indicative of an edge of the document.

An apparatus in accordance with the present invention for a document scanner includes a substantially cylindrical casing having a longitudinal central axis and an outer surface. A portion of the outer surface of the casing forms a width detection backer. The width detection backer portion of the outer surface is closer to the longitudinal central axis of the casing than is another portion of the outer surface. The width detection portion of the outer surface and the other portion of the outer surface are of contrasting colors.

A document scanner in accordance with the present invention includes an optical element having a field of view, a width detection backer, and a driver operatively connected to selectively position the width detection backer and the optical element relative one another so that the width detection backer is simultaneously in the field of view of the optical element and out of the focal plane of the optical element.

DETAILED DESCRIPTION OF A PREFERRED EMBODIMENT

Figure 1:
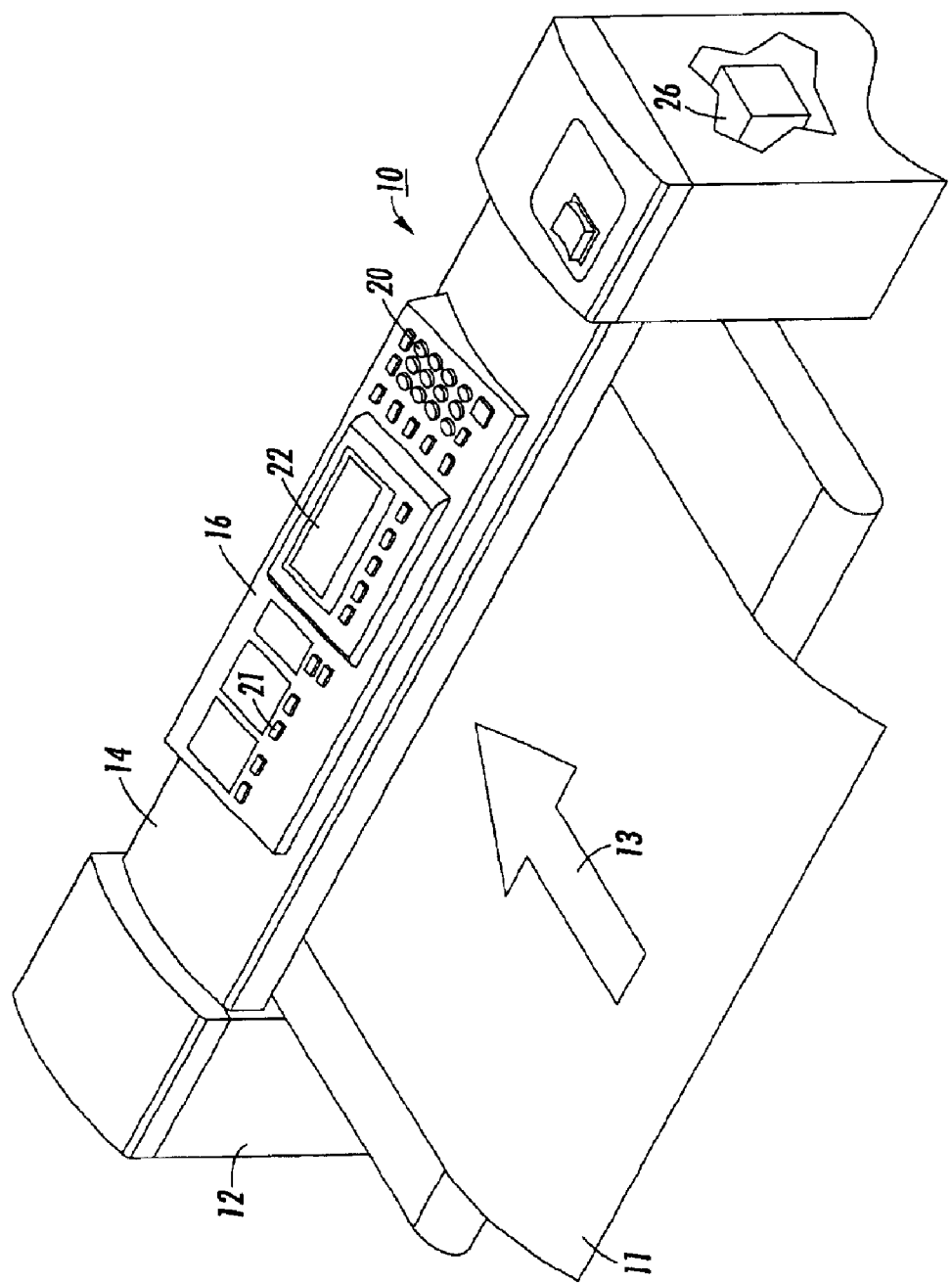
FIG. 1 is a perspective view of a document scanner incorporating the present invention.

The document scanner 10 illustrated in FIG. 1 is particularly designed to handle large format documents 11, such as engineering drawings, that may be up to 36 or more inches wide. Those skilled in the art will recognize that the invention described below may also be used in scanners designed for smaller documents. The scanner 10 includes a housing 12, a cover 14, and an user interface module 16. The housing 12 encloses an optical element in a manner that will be understood by those familiar with the art. For example, the housing may include a lens that focuses an image onto an array of photosensors, or may include an array of photosensors that receives the image directly. The optical element remains stationary within the housing during a scanning operation, and the document 11 is transported in a first direction 13 along a document path over the top of the housing 12, to draw the document past the optical element. A removable cover 14 encloses the document path. Other implementations may include moving optical elements and either stationary or moving documents.

A user interface module 16 on the cover provides information about the status of the scanner, and instructions for use. The user interface module 16 may include a keypad 20, control buttons 21, and/or a display screen 22, which screen may be touch sensitive. The detailed construction and features of the user interface module 16 depend on the specific functions and capabilities of the scanner. Also, the user interface module may be in other positions, including on another portion of the housing, or separated from the other elements of the scanner.

A computer 26 in the scanner is programmed to receive image data from the optical element of the scanner and perform various image processing functions on the data. The computer 26 is also connected to the user interface module 16 to receive instructions input by the user and to communicate information to the user through the display 22. The computer 26 may be connected to an external computer or other device (not shown) for further communication or processing of the image data, or to receive information or instructions from an external device. The computer 26 may be a general purpose microprocessor.

Figure 2:
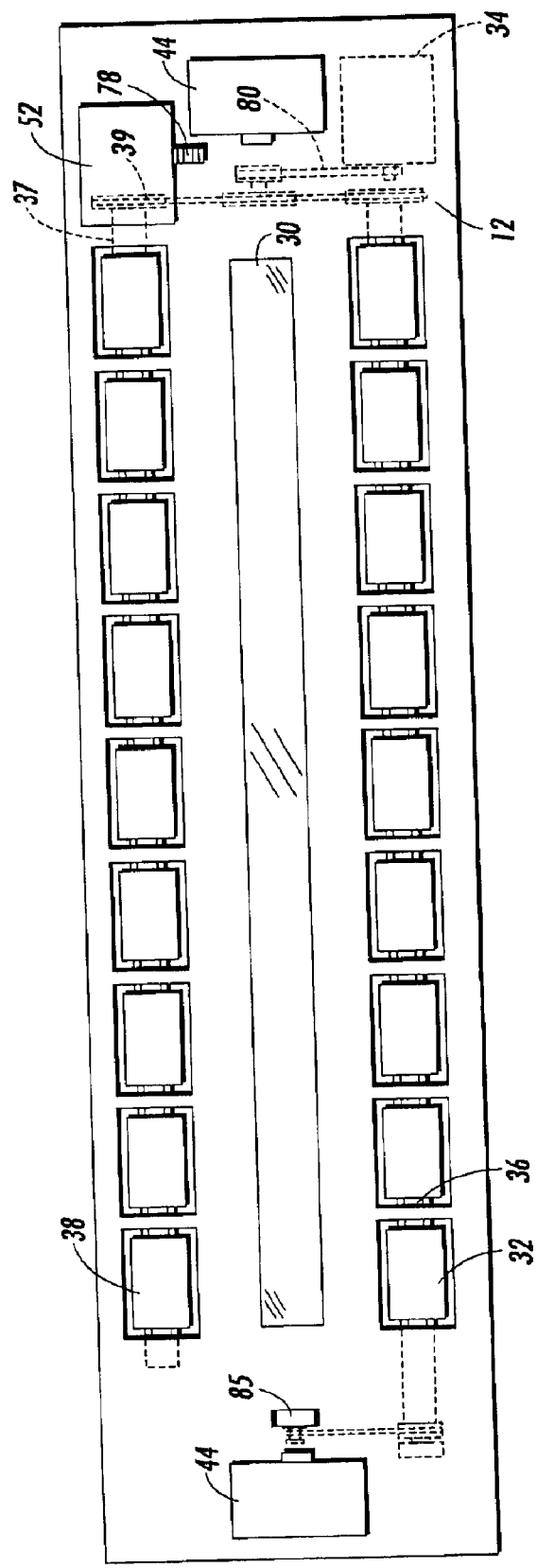
FIG. 2 is a top view of the scanner of FIG. 1, with the top cover, user interface panel, and calibration element removed.

Referring next to FIG. 2, the top of the housing is shown with the cover 14 and user interface module 16 removed. In the particular embodiment illustrated, the optical element is a linear array of photosensors 30 positioned so that when a document 11 (FIG. 1) is placed in the document path, the document 11 is at the focal point of each of the photosensors. The array of photosensors 30 extends across the width of the widest document to be scanned by the scanner. The document path and the array of photosensors is, for example, 36–37 inches (91.4–94.0 cm) wide. One particular mechanism for assembling such a wide array of photosensors from smaller arrays is described in pending U.S. patent application Ser. No. 09/677,742, filed Oct. 3, 2000, entitled "Assembly Of Imaging Arrays For Large Format Documents", by inventor Kraig A. Quinn. The linear array of photosensors has a field of view that is one pixel in the direction of document travel, and extends across the width of the document to be scanned. As will be understood by those familiar with the art, the photosensors convert successive pixel wide lines of the document into digital information that can be converted into a representation of the image on the document. For example, 100–400 (or sometimes more) sensors may be in each inch of the sensor array, yielding a corresponding number of pixels of data. With 100 sensors per inch, a 37 inch (94.0 cm) sensor array produces 3700 pixels of data for the full width of the array. Those skilled in the art will recognize that other types of optical structures can be used, including one or more lenses that focus the document image on a smaller array of photosensors.

A document transport mechanism includes leading document transport rollers 32 on the leading side of the optical element 30 to draw a document 11 (FIG. 1) in a first direction 13 along a document path into the scanner, and past the field of view of the optical element 30. A transport motor 34, such as a stepper motor, is operatively connected to the transport rollers 32 to rotate the transport rollers. For example, the transport rollers may be connected to a common axle 36 that is driven by the transport motor 34. Trailing transport rollers 38 on a common axle 37 may be on the trailing side of the optical element. These trailing transport rollers 38 may be freewheeling, or they may also be driven by the transport motor 34. In the illustrated embodiment, the transport motor 34 is connected to the leading roller axle 36 the trailing roller axle 37 by a pulley 39. Those familiar with the art will recognize the cover 14 has a structure such as backing rollers (not shown) that match the transport rollers 32, 38 to provide the necessary frictional force between the transport rollers 32, 38 and a document 11 (FIG. 1).

Figure 3:
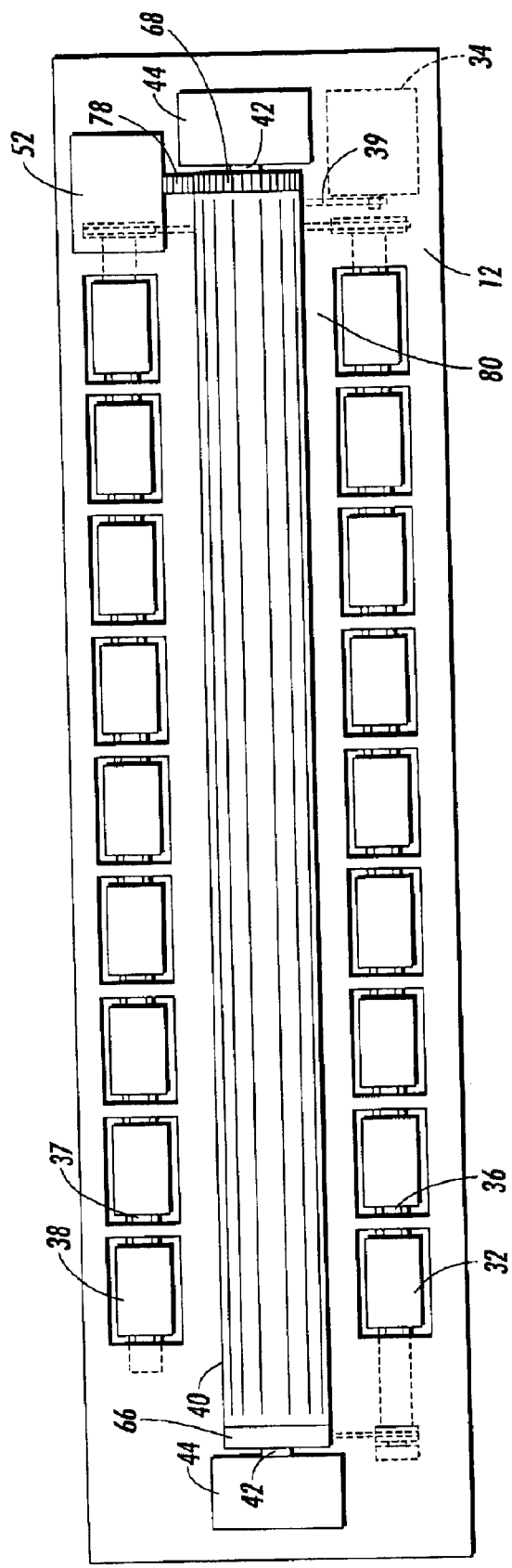
FIG. 3 is another top view of the scanner of FIG. 1, with the calibration element in position.

Referring next to FIG. 3, the housing of the scanner is shown with a calibration apparatus 40 in accordance with an aspect of the present invention installed. The calibration apparatus 40 is a substantially cylindrical casing having a central axis. An axle coincides with the axis, and has its two ends 42 mounted in an opposed pair of axle mounts 44 on the housing 12. The axle mounts 44 are positioned outside the ends of the optical element 30, so that the axis of the calibration casing is aligned directly above the optical element 30. The axle of the calibration apparatus 40 may consist of a pair of axle ends 42 at the ends of the casing, rather than a continuous element along the entire length of the casing. The axis of the calibration apparatus 40 is perpendicular to the direction 13 of the document path.

The calibration apparatus can be rotated about its central axis to present different portions of the outer surface of the calibration apparatus to the optical element 30 (FIG. 2). A driver 52, such as a stepper motor (FIG. 3) is connected to the calibration apparatus by gears, a drive belt or other mechanism to provide such rotational movement.

Figure 4:
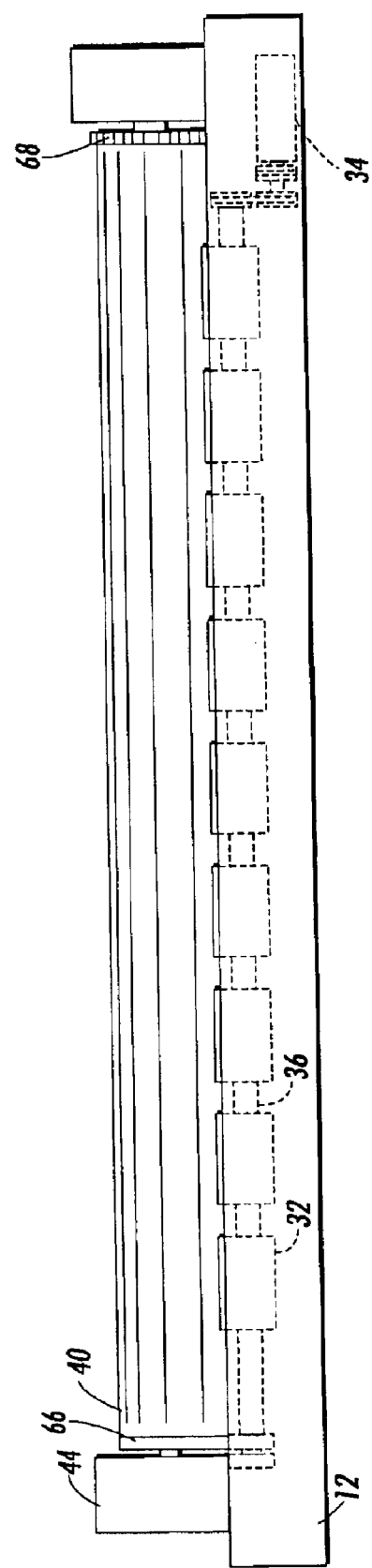
FIG. 4 is a front view of a scanner incorporating the present invention, with the cover and user interface panel removed.

Referring next to FIG. 4, a front view of the scanner (with the cover 14 removed) shows the cylindrical calibration apparatus 40 positioned on the axle mounts 44. As is apparent from FIG. 4, the transport rollers 32 are positioned to draw a document to be scanned beneath the calibration apparatus 40.

Figure 5:
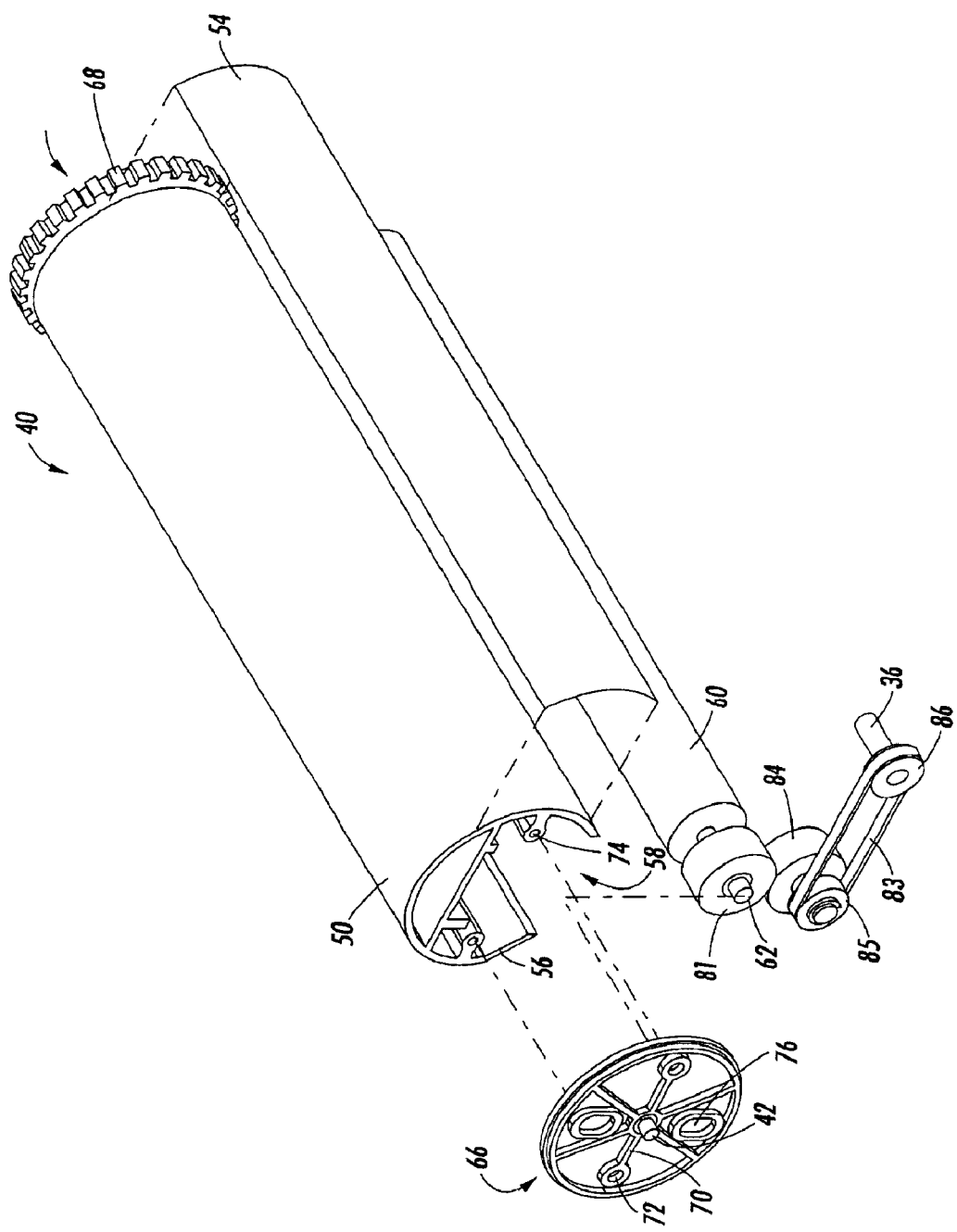
FIG. 5 is an exploded view of a calibration cylinder incorporating an aspect of the present invention.

An exploded view of a particular implementation of the calibration apparatus 40 incorporating an aspect of the present invention is shown in FIG. 5. The calibration apparatus includes a substantially cylindrical casing 50 having a longitudinal axis. The casing 50 may be formed of extruded aluminum or plastic, or of molded metal, plastic, or other materials. Extruded aluminum provides a high degree of precision for the casing 50. The length of the casing may be the same as, or slightly greater than the width of the document path. For example, for a scanner with a 36 inch (91.4 cm) wide document path, the casing may be 36 to 37 inches (91.4 to 94.0 cm) long. The casing diameter may be 2 to 5 inches (5.1 to 12.7 cm).

Referring again to FIG. 5, a first portion of the outer surface of the calibration casing 50 forms a light receptivity calibration area 54. The light receptivity calibration area permits the scanner to calibrate the light receptivity of the optical element. The white calibration area encompasses a segment of the circumference of the outer surface of the cylinder with a known, highly uniform color, such as white. A strip of highly uniform, white material may be applied to the outer surface of the casing with adhesive, or other attachment materials. Preferably, the white calibration area has a length along the length of the casing 50 substantially equal to or slightly larger than the longitudinal field of view of the optical element, and a width about the circumference of the casing somewhat larger than the field of view of the optical element in the document transport direction. For example, the white calibration area 54 may extend along the entire length of the casing 50, and may be one half inch to one inch in width about the circumference of the casing.

A second portion 56 of the outer surface of the calibration casing 50 encompasses another section of the circumference of the outer surface. The second portion 56 is a contrasting color to the color of the white light receptivity calibration area. This second portion 56 of the casing surface forms a document width detection backer. For example, the second (width detection backer) portion of the outer surface of the calibration apparatus may be black. In a particular embodiment, the entire casing 50 is powder coated in black pigment, including the width detection backer portion 56 of the calibration casing. Preferably, the width detection backer portion 56 of the calibration casing is slightly recessed from a truly cylindrical shape. For example, the width detection portion 56 may be a flattened segment of the outer surface of the otherwise cylindrical calibration casing 50, so that the surface of the width detection backer portion 56 is closer to the longitudinal axis of the casing than are other parts of the outer surface of the casing, such as the with light receptivity calibration area 54.

A third portion of the calibration casing provides a document backer for holding a document being scanned tight and in position at the focal point of the optical element 30 (FIG. 2). In the illustrated embodiment, the backer element includes a longitudinal slot 58 in the outer surface of the calibration casing 50. This slot 58 extends along the entire length of the calibration casing. A backer roller 60 has a diameter smaller than the diameter of the calibration casing 50. The backer roller 60 fits inside the calibration casing so that the longitudinal axis of the backer roller 60 is substantially parallel to, but offset from, the axis of the calibration casing 50. The outer surface of the backer roller 60 is uniform in color, preferably white, so that the backer roller does not interfere with the images on transparent documents that are scanned by the scanner. The backer roller may be formed of aluminum and uniformly powder coated with white pigment. The backer roller 60 has a central axle 62. The axle may be continuous through the length of the backer roller, or may consist of two axle ends.

A pair of end caps 66, 68 are secured to the ends of the calibration casing 50. In the illustrated embodiment, the end caps 66, 68 are substantially circular in shape, and have substantially the same diameter as the diameter of the cylindrical casing 50. The end caps include the central axle ends 42 for the calibration apparatus 40, and radial spokes 70. Two of the spokes may contain screw openings 72 that may be aligned with openings 74 on the interior of the calibration casing to receive mounting screws (not shown) that attach the end caps 66, 68 to the calibration casing 50. In the illustration of FIG. 5, the right end cap 68 is shown attached to the casing. The perimeter of the right end cap 68 is toothed to engage the drive mechanism 52 rotating the casing 50 about its longitudinal axis.

Each end cap also includes an elongate slot 76 having its long dimension along a radius of the end cap. The slot 76 receives an end of the axle 62 of the backer roll. The elongate shape of the slot allows the axle of the backer roll to move in a radial direction with respect to the calibration casing 50.

Figure 6:
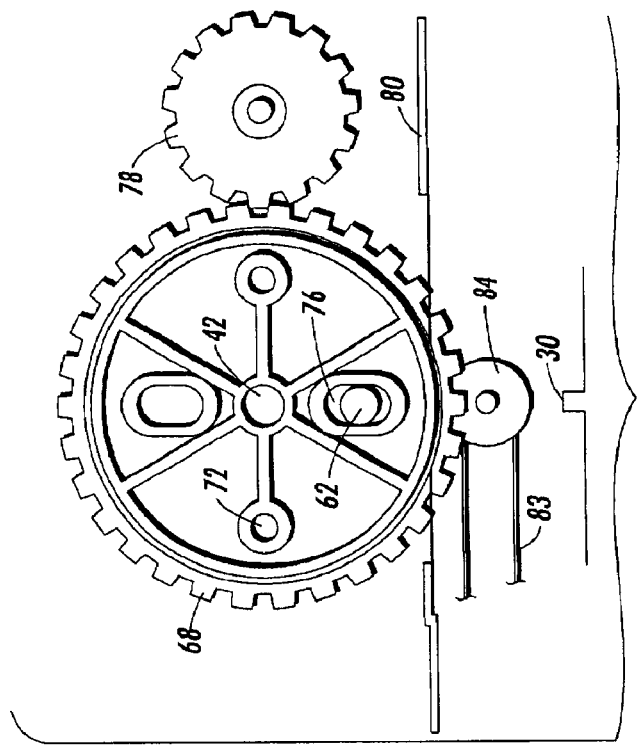
FIG. 6 is a right end view of the assembled calibration cylinder of FIG. 5.

FIG. 6 shows a right end view of the calibration apparatus with the end cap 68 on, together with a drive gear 78 from the stepper motor 52 on the scanner housing (FIGS. 2 and 3). The exemplary drive gear illustrated is a circular toothed gear, the teeth of which match the teeth on the perimeter of the end cap 58. As the stepper motor 52 (FIGS. 2 and 3) rotates the drive gear 78, the drive gear 78 engages the end cap 68 and rotates the calibration element 40 to selectively place the light receptiveness calibration strip 54, the width detection backer portion 56, or the backer roller element 60 (FIG. 5) facing in a direction to be viewed by the optical element 30 of the scanner (FIG. 2). The calibration apparatus is shown in FIG. 6 with the document backer element 60 facing downward, toward the optical element 30. The axle end 62 of the backer roll is visible in the elongate slot 76. This is the "rest" position of the calibration apparatus, and also the position when a document is being scanned.

Also shown in FIG. 6 is a document support surface 80 formed of a portion of the top of the scanner housing 12. The document support surface 80 supports a document on either side of the field of view of the optical element 30. An opening 82 in the document support surface provides an optical path between the document and the optical element. During a document scan, the backer roller 60 holds the document tight at the focal point of the optical element. The document transport rollers 32, 38 (FIGS. 3 and 4) further help hold the document tight across the opening. The elongate slots 76 holding the ends of the axle 62 of the backer roller 60 permit the backer roller to move radially with respect to the calibration cylinder, so that the scanner can accommodate documents of different thicknesses. As a thicker document passes under the backer roller, the document pushes the backer roller towards the center of the calibration cylinder. The backer roller 60 may be weighted, so that it continues to assist in holding the document taut.

Figure 7:
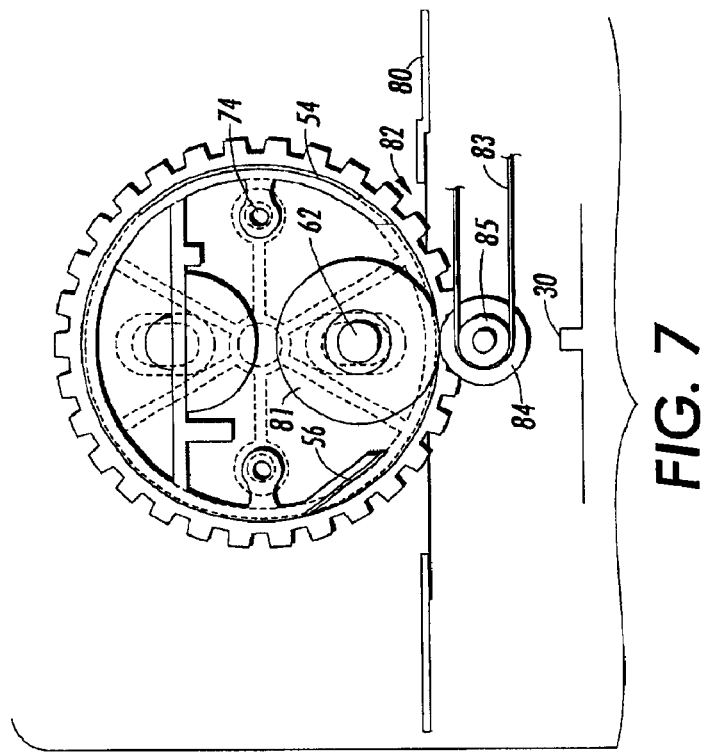
FIG. 7 is a left end view of the assembled calibration cylinder of FIG. 5.
Figure 9:
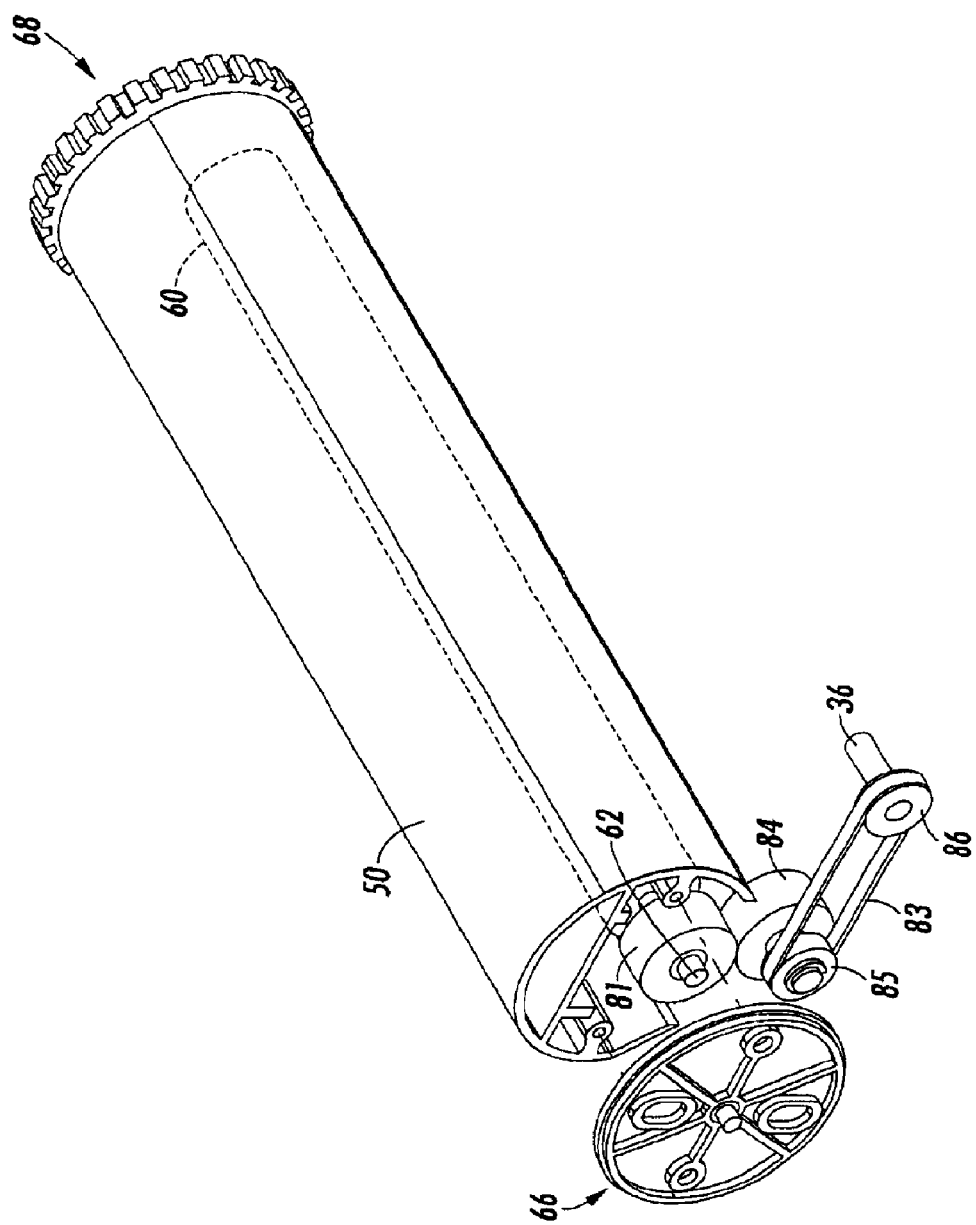
FIG. 9 is an enlarged top view of a portion of the scanner of FIG. 1, with the cover and user interface panel removed.

Referring next to FIG. 7, the left end of the calibration apparatus is shown with the end cap 66 shown in phantom lines. The teeth of the right end cap 68 are visible in FIG. 7, although they are at the far end of the cylinder. Referring next to FIGS. 5 and 9, at the end of the backer roller 60 a friction wheel 81 engages a drive wheel 84. The drive wheel is driven by the transport motor 34. Such a connection allows the transport motor 34 to rotate the backer roller 60 at the same time it rotates the document transport rollers 32. For example, a pulley 83, such as an o-ring, connecting a pulley wheel 86, the axle 36 of the leading transport rollers 32 (FIGS. 2 and 3) rotates the pulley wheel 85 and thus the drive wheel 84. The drive wheel 84 then frictionally engages the friction wheel 81 of the backer roller 60. The outer diameters of the pulley wheel 84, the drive wheel 85 and the friction wheel 81 are sized relative to the diameter of the backer roller so that as the motor 34 rotates the transport rollers 32, 38 to transport the document a particular rate, the backer roller 60 is rotated at a speed such that the surface of the backer roller moves with the document at exactly the same rate. In that way, the backer roller 60 tends to neither accelerate nor impede the progress of the document past the optical element 30. In lieu of the separate friction wheel 81 on the backer roller, the backer roller itself may frictionally engage the drive wheel 84. Alternatively, the friction wheel 81 may be positioned outside the end cap 66. The portion of the backer rollers axle 62 between the backer roller 60 and the friction wheel 81 passes through the elongate slot 76. Also, it will be apparent that the drive mechanism for the backer roller may be placed at the right end of the calibration apparatus, and the drive mechanism for the document feed rollers may be placed on the left end of the scanner. Although the drive mechanisms are shown on opposite ends of the scanner, they may also be placed on the same end.

Figure 8:
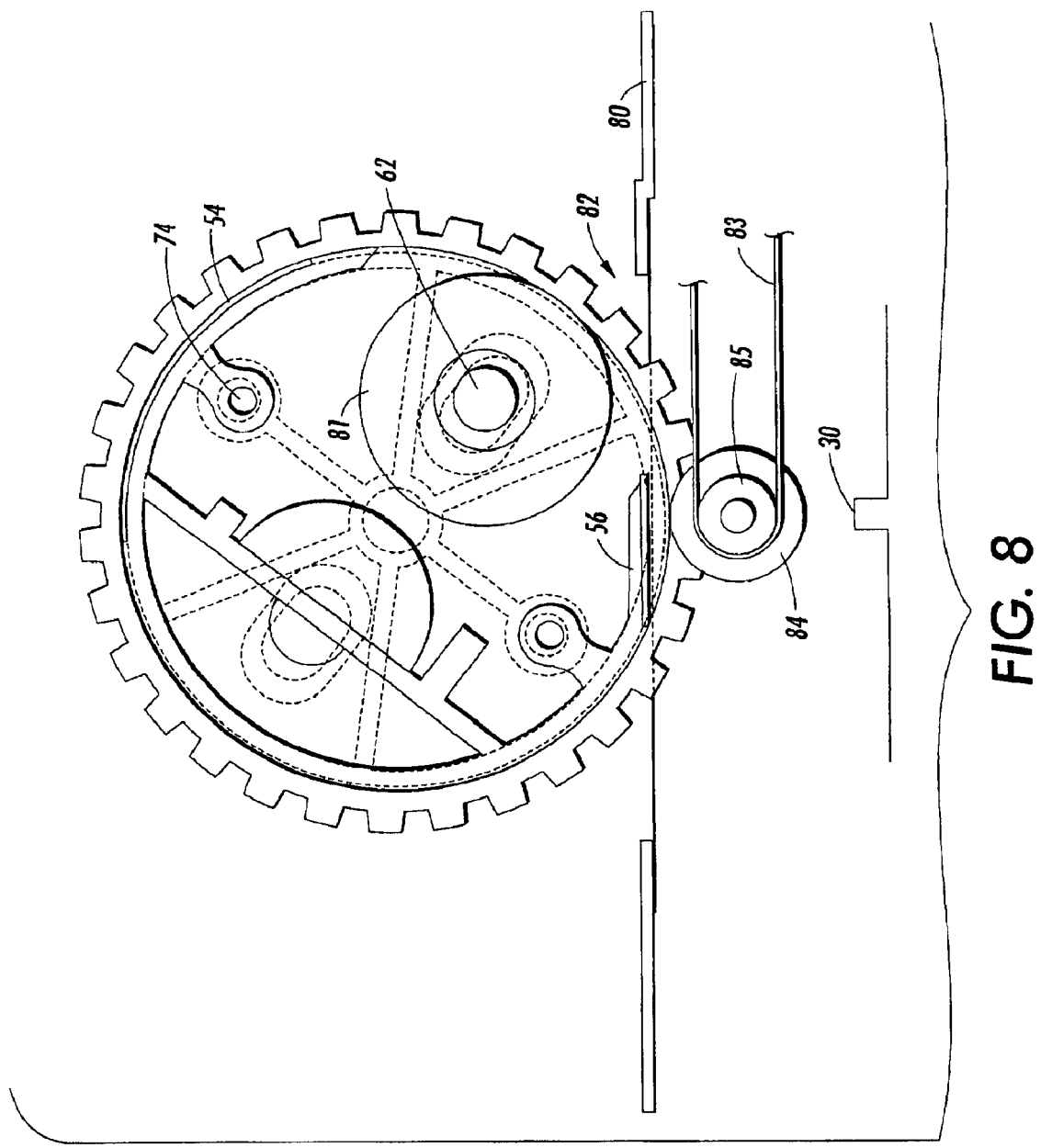
FIG. 8 is a left end view of the assembled calibration cylinder of FIG. 5, rotated to an additional position.

The stepper motor 52 rotates the calibration element to a second position so that the width detection backer portion 56 of the cylinder surface is in the field of view of, and facing the optical element 30, as shown in FIG. 8. As noted above, the width detection backer 56 is preferably slightly recessed, so that it is beyond the focal point of the optical element. Thus, the width detection backer 56 appears out of focus to the optical element 30. With the width detection backer 56 of the cylinder surface out of focus, variations in the surface of the width detection segment become less visible to the optical element, so that the surface of the width detection backer 56 appears more uniformed in color and texture. Such uniformity of appearance reduces the possibility of incorrectly identifying variations in the backer 56 as document edge-like features.

When a document is placed in the optical path between the optical element and the width detection segment 56 of the calibration casing, the document will be closer to the focal plane of the optical element. Thus, images printed on the document as well as variations in the document surface (such as variations in texture or print media color) will be more visible to the optical element. Thus, an analysis of the data detected by the optical element will show a higher level of variability in the light intensity reflected from the document than from the width detection backer 56 of the calibration structure that is visible to the optical element on either side of the document. The computer 26 (FIG. 1) analyzes the data from scanning portions of the document and the width detection portion of the calibration structure can then readily identify the difference between the document (with a high degree of variability and the image information) and the width detection portion of the calibration structure (with a minimal degree of variability in the scanned information). Various algorithms for performing such analysis are widely known and available to those skilled in the art.

In addition, as noted above, the width detection backer portion 56 of the calibration structure is preferably black in color. The black contrasts sharply with most documents to be scanned, which are typically printed on white or other light colored print media.

Once the width of the document has been determined, the stepper motor 52 rotates the calibration element to a third position to place the document backer roller element 60 in the field of view opening through the document support surface 80, facing the optical element 30. The document may then be scanned. The document backer roller 60 rotates about its axis on the axle ends 62 so the document does not bind as it moves across the document backer. In a particularly preferred embodiment, the backer roller 60 is driven by the transport motor 34, so that the backer roller rotates at the same rate as the document transport rollers. In this way, the backer roller assists in moving the document in a first direction along the document path past the optical element.

As the calibration apparatus moves through its rotational positions, the central axis of the calibration element casing remains fixed on the axle ends 42, so that the alignment of the backer element is not affected by movement during the calibration process.

In one particular implementation, the width detection process includes two steps. The first step includes first positioning the calibration structure so that the white document backer element 60 is in the field of view opening through the document support surface, facing the optical element 30. The document transport rollers 32, 38 draw a portion of the document to be scanned past the field of view of the optical element 30. As the portion of the document is drawn past the optical element 30, the optical element scans that portion of the document for information indicative of a document edge. In a scanner equipped to process color documents, this step of partial scanning for document edge detection may be conducted in gray scale to simplify the analysis process.

This partial scanning with the white backer roller 60 in place is particularly beneficial in locating the edges of a document having a dark background. In the particular implementation shown, both the document and the backer roller 60 are at the focal plane of the optical element, so that care should be taken to avoid false edge detection due to marks on the backer roller 60 outside the edges of the document, or bad sensors.

Approximately 70 lines of the document may be scanned with the document backed by the white document backer roller element 60. The computer 26 analyzes the data gathered from scanning this portion of the document to identify changes in intensity and other indications of possible document edge features. The number of lines scanned with either the document backer element 60 in the view of the optical element 30 may vary depending on the desired performance characteristics. A minimum number of lines, such as 50–70 lines, should be scanned to ensure that the scanning operation gathers sufficient data to be able to identify edge-like features of the document. As many lines as desired can be scanned, though most users will want to limit the number of lines scanned to 70–100 lines so that the document width detection process does not take an exceptionally large amount of time.

After this first portion of the document is scanned, the driver 52 rotates the calibration structure 40 so that the width detection backer segment 56 of the surface is in the field of view of the optical element 30. An additional portion of the document is scanned for additional indications of document edge data. As noted above, most documents are printed on a light colored medium, so that a high level of contrast is likely to exist between the document and the black or dark colored width detection backer segment 56.

In addition, as noted above, with the width detection backer 56 out of focus with respect to the optical element 30, the scanner will detect little or no variation in the intensity and other attributes of the width detection backer 56. In contrast, the document moving past the optical element, which document is closer to the focal plane of the optical element, will demonstrate a relatively higher level of variability to intensity and contrast data. Thus, the edge detection algorithm is less likely to incorrectly identify attributes of the width detection backer as parts of the document, and thus is less likely to incorrectly identify document edge features.

Furthermore, with the width detection backer stationary with respect to the optical element, the data associated with the width detection backer will exhibit little or no change while scanning the additional portion of the document. In contrasts, as the document moves past the optical element, the intensity and other attributes of the data associated with the document will exhibit a much higher degree of variability or change. Thus, the edge detection algorithm is even less likely to incorrectly identify attributes of the width detection backer as document edge features.

In the preferred implementations, the width detection backer 56 does not contact the document. This lack of contact helps to preserve the width detection segment surface from scratches, dirt, and other elements that may adversely effect the uniformity of the surface of the width detection backer 56. Those items could introduce artifacts into the data obtained from scanning the width detection backer. Such artifacts may create the possibility of erroneous edge detection.

The number of lines of the document scanned with the width detection backer 56 in the view of the optical element 30 is similar to the number of lines scanned with the backer roller 60 in the field of view. Again, a minimum number of lines, such as 50–70 lines, should be scanned to ensure that the scanning operation gathers sufficient data to be able to identify edgelike features of the document. As many lines as desired can be scanned, though most users will want to limit the number of lines scanned to 70–100 lines so that the document width detection process does not take an exceptionally large amount of time.

By thus scanning portions of the document with both a white or light colored backer (the backer roller 60) and a black or dark colored backer (the width detection backer 56), the scanner is likely to accurately identify the edges of the document regardless of whether the document has a light or dark colored background. Therefore, those skilled in the art will recognize that although the document backer element 60 is described above as being white in color, while the width detection segment 56 is described as black, those elements may be made of other colors, ideally colors that contrast with one another, so that between them, they contrast with a wide variety of document colors.

An optical element 30 with a relatively short depth of focus is preferred. A short depth of focus permits a small recess or flattening of the width detection backer 56 relative to other parts of the surface of the calibration cylinder 50 to place the width detection backer 56 out of focus with respect to the optical element 30 without needing to move the axis of the calibration cylinder.

Those skilled in the art will recognize that variations and modifications may be made to the specific implementation described above without departing from the scope of the invention. For example, other shapes of calibration structures may be used, and the specific calibration regions on the exterior surface of the calibration apparatus may be positioned or shaped differently from the specific implementation described above. In addition, different types of backers element structures may be used, as well as different types of drive elements for moving the calibration apparatus, the backer elements, and the document feed structure. Therefore, the scope of the present invention should not be limited to the specific details of the implementation described above.

I claim:

1. A method of identifying the edges of a document being scanned in a scanner, wherein the scanner includes an optical element having a focal plane, the method comprising:
   positioning a width detection backer simultaneously in the field of view of the optical element of the scanner and out of the focal plane of the optical element;
   positioning a portion of a document in the optical path between the optical element and the width detection backer;
   scanning the portion of the document with the optical element; and
   analyzing information from the scanning step to identify data indicative of an edge of the document;
   wherein the step of positioning a portion of the document in the optical path comprises spacing the document from the width detection backer.

2. The method of claim 1, wherein the step of positioning a portion of the document in the optical path additionally comprises positioning the portion of the document substantially at the focal plane of the optical element.

3. A method of identifying the edges of a document being scanned in a scanner, wherein the scanner includes an optical element having a focal plane, the method comprising:
   position a width detection backer simultaneously in the field of view of the optical element of the scanner and out of the focal plane of the optical element;
   positioning a portion of a document in the optical path between the optical element and the width detection backer;
   wherein positioning a portion of a document in the optical path between the optical element and the width detection backer comprises holding the optical element stationary and moving the document past the optical element along a document path;
   scanning the portion of the document with the optical element;
   wherein scanning the portion of the document comprises moving the document relative to the optical element;
   during the scanning step, holding the width detection backer stationary relative to the optical element;
   analyzing information from the scanning step to identify data indicative of an edge of the document; and
   selectively positioning the width detection backer out of the field of view of the optical element.

4. The method of claim 3, wherein:
   the step of positioning a width detection backer simultaneously in the field of view of the optical element of the scanner and out of the focal plane of the optical element comprises rotating a structure containing the width detection backer about an axis that is positionally fixed relative to the optical element; and
   the step of positioning the width detection backer out of the field of view of the optical element comprises rotating the structure containing the width detection backer about the axis.

5. A method of identifying the edges of a document being scanned in a scanner, wherein the scanner includes an optical element having a focal plane, the method comprising the steps of;
   positioning a width detection backer simultaneously in the field of view of the optical element of the scanner and out of the focal plane of the optical element;
   positioning a portion of a document in the optical path between the optical element and the width detection backer;
   scanning the portion of the document with the optical element;
   analyzing information from the scanning step to identify data indicative of an edge of the document;
   selectively positioning the width detection backer out of the field of view of the optical element; and
   during the step of selectively positioning the width detection backer out of the field of view of the optical element, selectively positioning an additional backer in the field of view of the optical element.

6. The method of claim 5, wherein:
   the step of positioning a width detection backer simultaneously in the field of view of the optical element of the scanner and out of the focal plane of the optical element comprises rotating a structure containing the width detection backer about an axis that is positionally fixed relative to the optical element; and
   the step of positioning the width detection backer out of the field of view of the optical element comprises rotating the structure containing the width detection backer about the axis.

7. The method of claim 5, additionally comprising the steps of:
   providing the width detection backer with a first color; and
   providing the additional backer with a second color that contrasts with the first color.

8. An apparatus for a document scanner, the apparatus comprising a substantially cylindrical casing having a longitudinal central axis and an outer surface, wherein:

a portion of the outer surface encompassing a first segment of the circumference of the outer surface of the casing forms a width detection backer, wherein the width detection backer portion of the outer surface is closer to the longitudinal central axis of the casing than is another portion of the outer surface; and the width detection backer portion of the outer surface and the other portion of the outer surface are of contrasting colors.

9. The apparatus of claim 8, wherein the width detection backer portion of the outer surface of the casing is substantially flat.

10. The apparatus of claim 9, wherein the width detection backer portion of the outer surface is substantially black, and the other portion of the outer surface is substantially white.

11. A document scanner comprising:

an optical element having a field of view;

a width detection backer; and a driver operatively connected to selectively position the width detection backer and the optical element relative to each other so that the width detection backer is simultaneously in the field of view of the optical element and out of the focal plane of the optical element.

12. The document scanner of claim 11, additionally comprising a structure, wherein:

the width detection backer is on the structure; and the driver is operatively connected to the structure to selectively position the structure so that the width detection backer simultaneously in the field of view of the optical element and out of the focal plane of the optical element, and to selectively position the structure so that an additional portion of the structure is in the field of view of the optical element.

13. The document scanner of claim 12, wherein the width detection backer and the additional portion of the structure have contrasting colors.

14. The document scanner of claim 13, wherein the structure comprises a substantially cylindrical casing having a longitudinal central axis and an outer surface, wherein:

a portion of the outer surface encompassing a first segment of the circumference of the outer surface of the casing forms the width detection backer; and the width detection backer portion of the outer surface is closer to the longitudinal central axis of the casing than is another portion of the outer surface.

15. The document scanner of claim 14, wherein the width detection backer portion of the outer surface of the casing is substantially flat.

* * * * *